No. 636,256.  
E. GATES.  
APPARATUS FOR SIMULTANEOUSLY PURIFYING, COOLING, AND REGULATING MOISTURE OF AIR.  
(Application filed June 29, 1898.)  
Patented Nov. 7, 1899.  
(No Model.)  
3 Sheets—Sheet I.
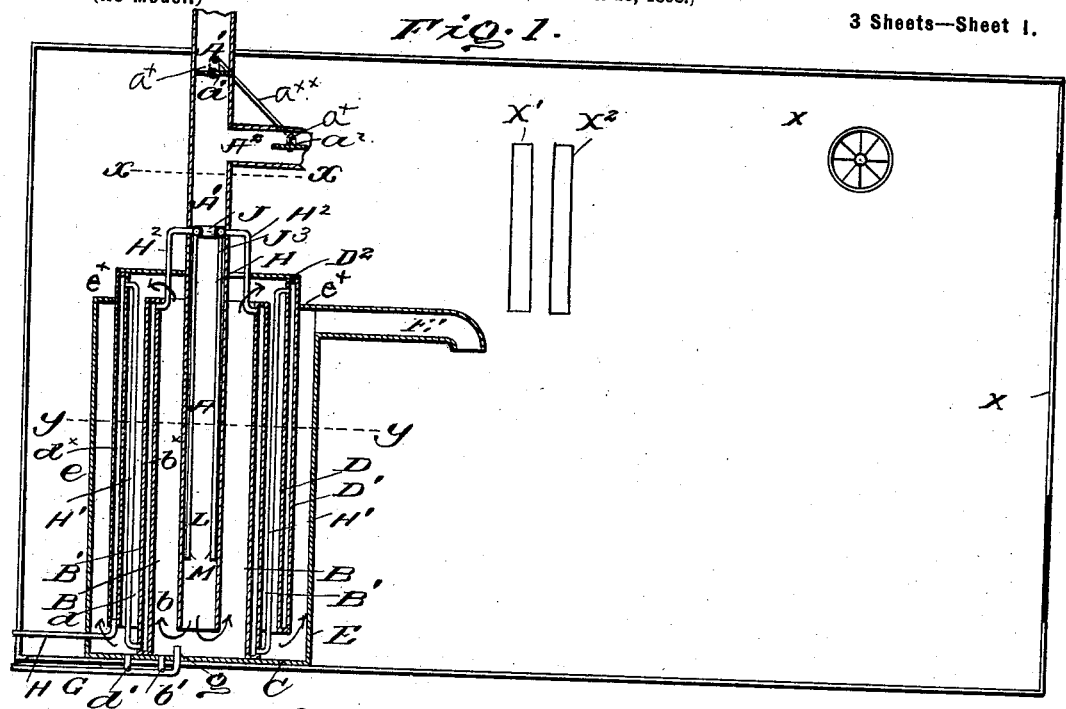
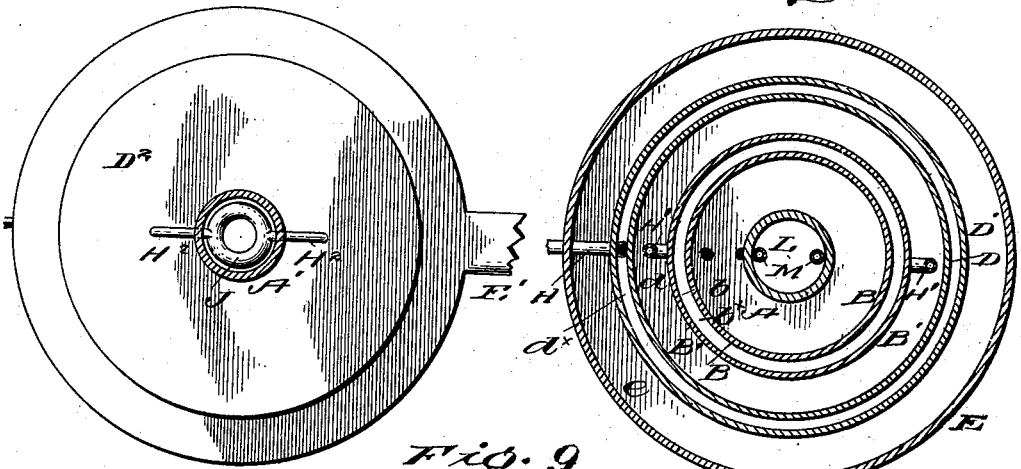
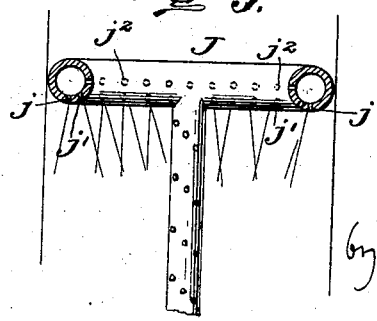
Witnesses  
Inventor  
Elmer Gates,  
Attorney.

No. 636,256.  
E. GATES.  
APPARATUS FOR SIMULTANEOUSLY PURIFYING, COOLING, AND REGULATING MOISTURE OF AIR.  
(Application filed June 29, 1898.)  
(No Model.)  
Patented Nov. 7, 1899.  
3 Sheets—Sheet 2.
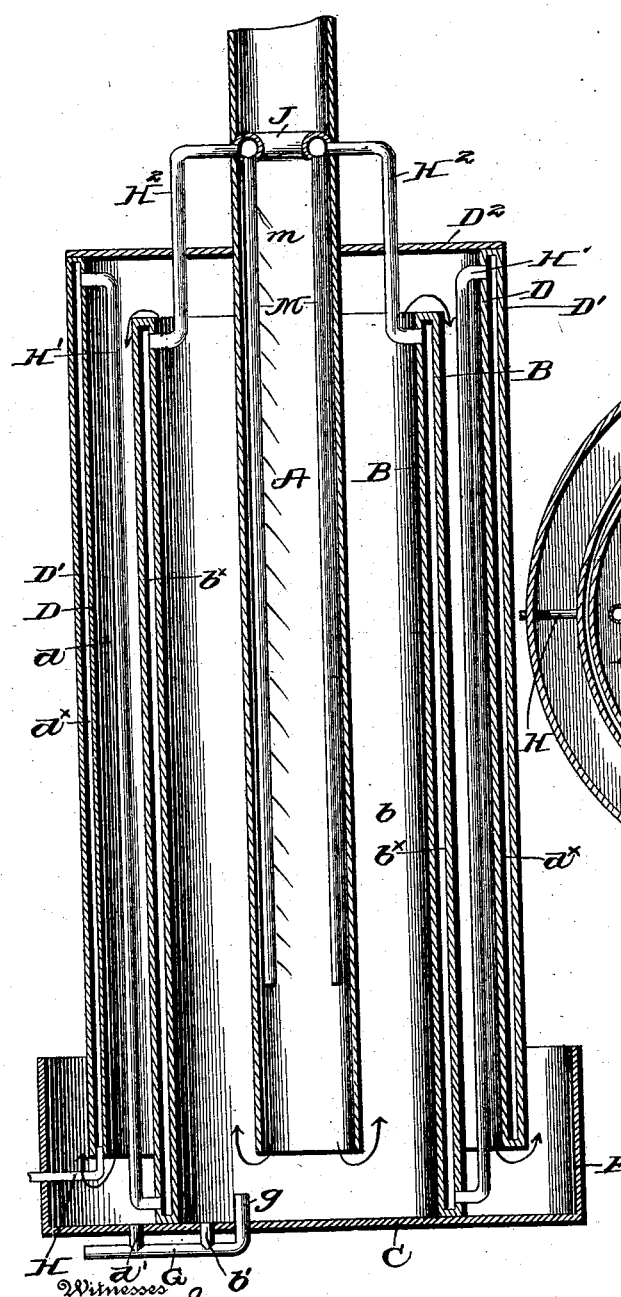
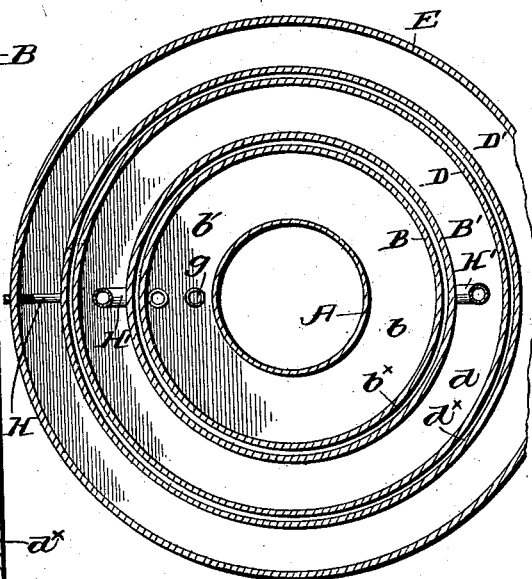
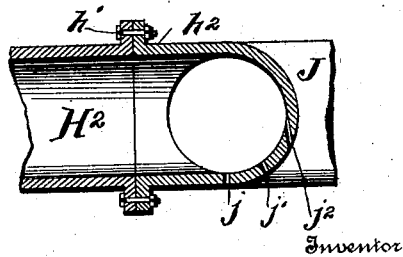

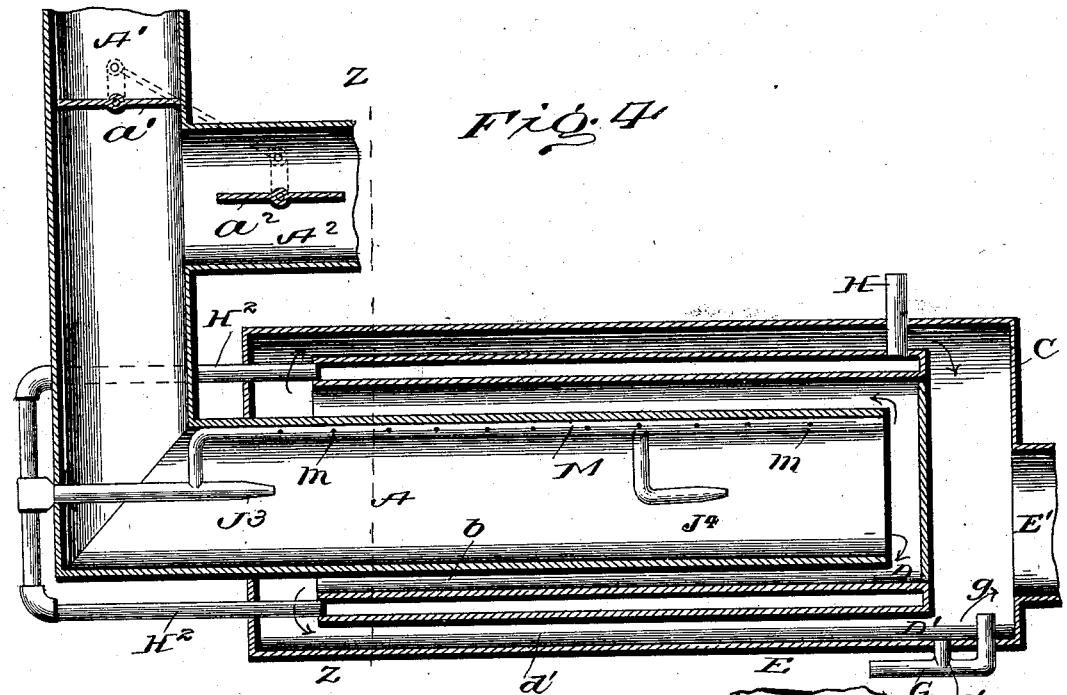
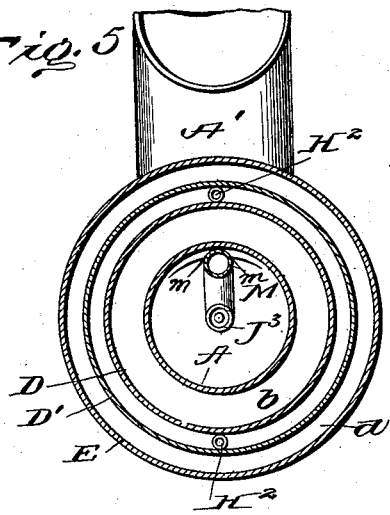
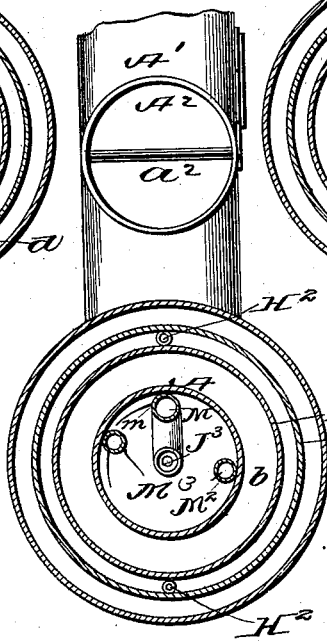
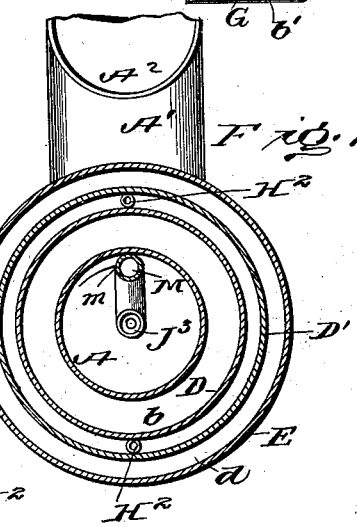

UNITED STATES PATENT OFFICE.

ELMER GATES, OF CHEVY CHASE, MARYLAND.

APPARATUS FOR SIMULTANEOUSLY PURIFYING, COOLING, AND REGULATING MOISTURE OF AIR.

SPECIFICATION forming part of Letters Patent No. 636,256, dated November 7, 1899.

Application filed June 29, 1898. Serial No. 684,749. (No model.)

*To all whom it may concern:*

Be it known that I, ELMER GATES, a citizen of the United States, residing at Chevy Chase, in the county of Montgomery and State of Maryland, have invented certain new and useful Improvements in Apparatus for Simultaneously Purifying, Cooling, and Regulating the Moisture of Air, of which the following is a specification, reference being had therein to the accompanying drawings.

My invention relates to that class of apparatus for rendering the air in rooms cool, comfortable, refreshing, and healthful for respiration during the summer season and in highly-heated furnace-rooms, &c., in which there is ordinarily employed a spray of water.

The methods heretofore employed for keeping rooms cool during the summer have not proven convenient or satisfactory, their failure to do so being emphasized in the attempts to cool the air of sick-rooms, work-rooms, and dining-rooms during the heated part of the day. The attempts have not only failed to cool the air, but have allowed it to remain dry, warm, stagnant, and depressing. Window-screens admit dust and hot air into the rooms. Fans produce unhealthful drafts and do not cool the air, and although they keep it in circulation they do not promote ventilation. Refrigerators are objectionable because of expense for ice and for the still greater expense of purchase and maintenance of cold-producing machinery, if used, and because they do not promote ventilation or sufficient circulation of the air. Refrigerators are also objectionable, because they condense the moisture out of the air, rendering it dry and unhealthful; but a refrigerator is also quite impracticable for ordinary domestic uses, because a very large refrigerating-surface would be needed to cool the air fast enough for the purposes of hygienic ventilation. Keeping the windows closed and darkened renders the air unhealthful because of the absence of sunlight, and the method does not keep the room cool if it is properly ventilated and people occupy it. No device is at present obtainable which makes it as inexpensive and convenient to quickly cool the air in any or all the rooms of a house as by means of a stove we can warm them. There are no devices which while they cool the air also free it from dust, foul gases, and other impurities and at the same time guarantees a certain and sure supply of fresh air. Neither have we any cooling devices which without a special and complicated system of hygrometers, moisture-producers, and moisture-condensers automatically regulate the humidity of the air.

It is the object of my invention to avoid the aforementioned defects in the present methods of cooling a room and to supply a new and efficient apparatus—a cooling-stove—which will as readily and quickly cool the air in a room in summer as a heating-stove will warm the same room in winter.

It is also the object of my invention not merely to cool the air, but at the same time to automatically bring a regulated quantity of air into the room and to force a corresponding quantity of breathed and warmed air out of the room, thus producing sanitary and sanatory ventilation.

A further object is to free the air from dust, odors, and gaseous impurities and to automatically regulate the amount of moisture, so that it may be neither too much nor too little for health and so that it may have a refreshing feeling and an invigorating effect.

Still another object of my invention is the production of thorough ventilation without drafts of air, and, lastly, it has been my object to produce a device which is simple, automatic, and inexpensive, so that, like an ordinary stove, it may readily be placed in any room, be ornamental, occupy but little space, and be easily managed without special instruction.

The invention is of value to the sick when the weather is hot, because, as is well known, the death rate is greatly increased by an oppressive temperature, and is also of value to working people in crowded establishments, not alone to their health, but to the employer, who thereby gets more labor performed in the same time; but the greatest value is in the home, where a cooled room secures comfort and rest during the day and recuperative sleep at night.

Figure 1 is a vertical section of an inclosed apartment containing an apparatus or stove containing my invention. Fig. 1ª is a central vertical section, enlarged, of a slight modification. Fig. 1$^b$ is a horizontal section, also enlarged, on line $y\ y$, Fig. 1. Fig. 2 is a horizontal section on line $x\ x$, Fig. 1. Fig. 3 is a horizontal section on line $y\ y$, Fig. 1. Fig. 4 is a vertical section of a modification. Fig. 5 is a vertical section on line $z\ z$, Fig. 4. Fig. 6 is a vertical section of a modification. Fig. 7 is a vertical section of another modification. Fig. 8 is a partial section, enlarged, of one of the dischargers. Fig. 9 is a discharger, enlarged.

Referring particularly to Figs. 1, 2, and 3, X X indicate the inclosing walls of a room or apartment, within which is located one form of my apparatus or "cooling-stove," as I prefer to call it.

A is a cylinder or shell made, preferably, of copper, galvanized iron, or other not-easily-corroded metal, circular in cross-section. An extension or continuation A' of this cylinder is designed to communicate with the air outside of the building and is provided with a damper $a'$, another branch or trunk A$^2$ opening into the apartment, preferably near the ceiling, with a valve or damper $a^2$, and these dampers are or may be connected with each other by means of cranks $a^\times\ a^\times$ and a link $a^{\times\times}$, (shown in Fig. 1,) so that they act reciprocally, one closing as the other opens. The cylinder A has its lower open end disposed a short distance above the lower end of a double-walled shell or cylinder B B', which is of greater diameter and is open at its upper end, but is closed at its lower end by a base-plate or head C, and D D' is another double-walled cylinder, the upper end of which is connected with cylinder A by an annular collar D$^2$, its lower end stopping somewhat short of the base-plate C. E is the outer or inclosing cylinder or shell, connected at top and bottom with the collar D$^2$ and base-plate C, respectively, and provided with one or more outlet-pipes E', as may be found desirable. Thus there is formed a series of concentric annular air-chambers $b\ d\ e$ around the central cylinder A, through which air can be moved in a sort of zigzag path, (indicated by the arrows on Fig. 1$^a$,) and as the air enters at the upper end of cylinder its direction of travel is reversed at the lower end of that cylinder—a fact of which advantage is taken in the treatment of the air, as will be explained. The base-plate or head C forms one wall of a draining water-receptacle. Any suitable construction may be adopted which will maintain the parts in proper relation to each other.

G is a drain-pipe, the upper end $g$ terminating a short distance above the base-plate C, with short pipes $b'\ d'$ communicating directly with the chambers $b\ d$. The presence of a series of small drain-pipes insures that under all the ordinary conditions there will be a satisfactory drainage with varying quantities of water flowing through the apparatus, the horizontal section of said pipe G being kept practically full of water at all times.

The double-walled chambers are both closed at top and bottom, thus forming two concentric water-chambers $b^\times\ d^\times$, disposed between the air-chambers $b\ d\ e$, but not communicating therewith.

H is a water-supply pipe which opens into the lower part of the water-chamber $d^\times$, with two water-pipes H' H' connecting the upper end of this chamber with the lower end of water-chamber $b^\times$ and other pipes H$^2$ H$^2$ connecting the upper end of chamber $b^\times$ with a discharger J, to be described. The water-supply pipe may be connected to a street-main or other source which will provide sufficient pressure, a main of regular waterworks being usually preferable because of the comparatively low temperature of water which has flowed such distance under ground.

J (see particularly Figs. 1, 8, and 9) is a discharger or annular sprayer disposed in the upper part of cylinder A, the construction and operation of which are substantially as follows: It is in the form of a hollow ring cylindrical in cross-section, with a series of perforations in its lower half. In order to obtain the best results, I prefer that its wall, or at least that part of it through which the perforations or discharge-openings are made, be of such thickness that each of the openings shall constitute, practically, a short tube of such length as to efficiently determine the direction taken by the fine stream of water passing through it, the stream being so small that it will break up into droplets. As is more plainly indicated in Fig. 9, the outer row $j$ or two rows of these perforations incline in such direction that the streams of water issuing from them are discharged against the inner wall of the cylinder A downwardly and tangentially in such way that the water moves over the said inner surface or wall in a spiral path and in a thin sheet. Other perforations $j'\ j^2$ have such pitch that the droplets travel in a somewhat spiral or circular path for some distance after leaving the annular sprayer, the result being that the water is broken up into a great multitude of rapidly downwardly moving droplets, which so nearly fill the space inclosed by the cylinder as to carry with them a downward-moving air-current drawn in at the top of the cylinder and traveling in a zigzag course or path through the air-chambers, as indicated by the arrows in Fig. 1, and thence out at E'. As shown in Fig. 1, the outlet-pipe may be extended to the middle of the room and the air discharged toward or upon a bed or other piece of furniture and upon a person lying thereon. It will be readily understood that the frictional engagement or contact of the downward tangentially moving droplets of water will produce a vortex-like movement of the air column within the cylinder A and that several functions are incident thereto. For instance, an increased volume of air will be drawn in at the top of said tube and discharged through the outlet-pipe. By reason of centrifugal action dust particles and other deleterious matter will be separated from the air-current, caught by the thin sheet of water which is moving in a spiral path around the inner surface of said cylinder, and discharged at the bottom into the water, finally passing out through the waste-pipe G. More or less of the heavier particles of matter not driven into the spirally-moving sheet of water will acquire such momentum while moving downward through the cylinder that instead of following the air-current in its reversed path upward through chamber $b$ will continue downward into the water which is flowing over the upper surface of the base-plate C and thence out through the waste-pipe. Thus the air which is finally delivered into the room will be practically freed from impurities.

It is important in an apparatus of this sort that there should be very little obstruction in the path traversed by the air-current on its way through the apparatus, particularly of a sort which would tend to interfere with the ready formation of a vortex-like movement within the cylinder A, where such is used for two reasons more especially, first, because it has been found that such formation of column facilitates the movement of the greatest amount of air through an appropriately-shaped trunk or conduit with the least expenditure of power, and, second, that character of moving column is the most effective in purifying the air through the operation of centrifugal action, and economy as regards these results is especially desirable in a machine in which the work is being done by water from the fact that undue or needless consumption of water will under many circumstances absolutely prevent their use in many places where their operation would be very serviceable. In the preferred form of my invention I have adopted a construction which, I believe, facilitates the formation of such vortex by whirling motion of the air-current in various ways. For instance, first, I combine with the upper end of cylinder A an inlet-tube section A' above the sprayer and disposed in line with said tube A and adapted to direct a column of air in which the formation of a vortex has been commenced to and through the sprayer, and, secondly, I combine with such inlet-tube one or more dampers or valves consisting of disks pivoted centrally within the inlet-section, which when open even only partially admit air around nearly their entire peripheries—a mode of operation which further facilitates the formation of the desired vortex—it being obvious from an examination of the drawings that when beginning to open the valves admit air over their diametrically opposite edges. Another important effect upon both the air and the impurities is produced by the water-droplets within the cylinder A and also by the cooling effect of the water within the double-walled cylinders—that is to say, an increase of speed in the downward movement of air owing to its becoming colder and therefore relatively more dense and heavy the longer it is subjected to the action of colder surfaces of any sort, whereby the cooled air not only falls faster than it otherwise would, and therefore draws more air through the cylinder, but also produces counter-currents traveling in approximately vertical planes within the cylinder, such counter-currents increasing the motion of particles of impurities and imparting to them a decided tendency to go out of the air-currents on tangential lines. More or less of the heavier particles of impurities not driven against the spirally-moving sheet of water which traverses the inner surface of cylinder A will acquire such momentum while moving downward through said cylinder that instead of following the air-current in its reversed path upward through chamber $b$ will continue downward into the water which is flowing over the upper surface of the base-plate C and thence out through the waste-pipe G. Thus the air which is finally delivered into the room will be practically freed of impurities. Again, the proportion of air which is drawn from the room, cooled, and returned to the room or is drawn from outside of the room, cooled, and then discharged into the room may by a proper use of the dampers be regulated to correspond with the varying conditions of each particular case, dependent in great measure upon the size of the room, the number of its occupants, the difference in temperature between the water that is being used and the temperature at which it is desired to maintain the air within the room, the hygrometric condition of the air drawn into the apparatus compared with that which is desired within the room, and other exigencies which may arise.

In regulating the hygrometric condition of the air within a room I utilize the well-known fact that the question of the extent to which the amount of moisture in air is changed by contact with water depends in part upon the temperature of the air relative to that of the water, the relative humidity of the air, the relative extent of exposed water-surface, and the rate of travel of the air in contact with such exposed water-surface. It is also the fact that the relative humidity of air can be reduced by contact with a comparatively cold surface, either wet or dry. Now by reason of the water being divided into droplets, whereby its exposed surface is greatly increased relative to the bulk of water being used, the movement, including the rotary motion of the droplets and their rapid fall through the air-current, I am able to rapidly vary the hygrometric condition of the air of the inclosed apartment within such limits as shall produce the best sanitary and sanatory conditions, and a further and very important feature of the apparatus and of its operation is the combination, with cylinder A, of the supplemental cold and relatively dry surfaces and air-chambers which are traversed by the air-current after it leaves the cylinder and where the latter part of the path of said air-current may be made progressively colder, with the result that the air continues to part with more and more of its moisture until it finally leaves the apparatus, or at least until it leaves the outer cylinder. After such limits as to hygrometric conditions in both directions shall have been ascertained and determined upon by any means they can be maintained with substantial uniformity by regulating the water-supply, together with, where greater accuracy is desired, the temperature of the water and the frequency with which the air of the apartment is run through the apparatus, using the dampers for that purpose, including of course a proper supply of fresh air through inlet-pipe A'. When such adjustments have been made, the operation of the apparatus will be continued automatically, practically, for quite a period of time.

In Fig. 1 I have indicated at X a ventilator which may be of any usual or approved sort, properly located, with one or more thermometers X' and hygrometers $X^2$, inspection of which will enable the attendant to determine the atmospheric conditions within the apartment and make the various adjustments above indicated, so as to secure the desired results.

The presence of the pipes M M in close proximity to the inner wall of cylinder A produces eddies immediately behind them, (having reference to the direction of travel of the air,) into which eddies the particles of impurities move and are caught by the water and carried down by it into the waste-pipe G, such collection of objectionable matter, including noxious vapors and odors, being made more effective by the difference in speed, direction, and character of movement within the eddies.

To facilitate connecting the water-pipes $H^2$ $H^2$ with the discharger or annular sprayer J, I propose to use at either side a flanged joint $h'$ $h^2$, (see Fig. 10,) the openings through which are of such size as will facilitate removing from the sprayer material which may accumulate therein, particularly such as would tend to obstruct the discharge-openings, and of course similar connections may be employed for the lower sprayer. As I do not wish to be limited to the use of the lower sprayer, I propose to provide pipes M M with a series of perforations which will discharge water tangentially downward and toward the center of the cylinder to assist in producing a vortex, especially in case said lower sprayer be omitted.

From an examination of the drawings it will be readily understood that when the apparatus is in operation the temperature of the water rises gradually from the time it enters the water-chamber $d^x$ until it reaches the water-receptacle and waste-pipe G by reason of its having absorbed heat from the air-current. So the said air-current as it passes through the apparatus after its direction of travel is reversed at the bottom of cylinder A is subjected to the action of an increasing condensation of its contained moisture, because it travels in contact with the surfaces of the double-walled cylinders B' D' and in a direction the reverse of that in which the water is moving and leaves the surface of those cylinders at practically the point where the water enters them and where they are of course the coldest, for which reason the air constantly parts with moisture from the time it leaves cylinder A until it leaves air-chamber e.

In Fig. 4 I have illustrated a modified construction and arrangement of my invention, which is more especially adapted for use under some circumstances—as, for instance, where the vertical space to be occupied is limited, but the horizontal space is not materially restricted.

Referring particularly to Figs. 4, 5, 6, and 7, the air-inlets, preferably cylinders A A' $A^2$, are substantially like the correspondingly-lettered parts above described, except that cylinder A is disposed in a horizontal position for the reason heretofore given. The double-walled cylinder D D' and the outer inclosing cylinder E are like those of the other figures, with the exception of their horizontal arrangement, a slight change in the water-pipe connections, and the connection of the waste-pipe G directly with the lower part of cylinder E, the outlet branch or trunk E' being connected with the said cylinder, preferably with the closing plate or head C. Within cylinder A, I place a discharge nozzle or sprayer $J^3$, which is constructed in any usual or approved form, to deliver a series of water-jets, part of which direct said jets tangentially against the inner wall of the cylinder and toward the right-hand open end thereof, part of them discharging in the form of a rather fine spray from the tapering end of $J^3$ and on lines practically parallel with the axis of the cylinder. Such movement of the water-jets will produce a somewhat spiral sheet of water around the inner surface of the cylinder for a short distance from its receiving end, the water finally flowing down to the bottom of the trough-like lower side of the receiving end of cylinder A and out of its delivery end into the lower part of the double-walled cylinder B, thence through the trough of cylinder D and D' and through cylinder E, and out at the waste-pipe G. The effect of the discharge of water-jets into cylinder A is to move a current of air inward through the air-inlets, or one of them, as the case may be, and thence through the entire apparatus; but where the length of the cylinder is such as to make it desirable I propose to duplicate, once or twice, such sprayers, (see Fig. 4,) each of which will accelerate the forward movement of the air-current. When the air becomes cooled by contact with the water-spray, it will descend to the bottom of the cylinder-trough and the warmer portions of the air will ascend, thus keeping up series of spiral rotatory air-currents having their planes of rotation somewhat inclined from a perpendicular to the axis of the cylinder, which movement of the air will produce a decided pull upon the air entering through the inlet-pipes, and substantially the same movements of the air-current will be carried on within the air-chambers $b$ $d'$, thereby increasing the effective operation of the apparatus. M is a water-pipe disposed to lie parallel with the axis of the cylinder, and near its upper wall with a series of discharge-openings $m$ $m$, which discharge water tangentially forward against the inner wall of the cylinder, and thus supplement the sprayer or sprayers, as the case may be, in their action upon the air and impurities. Thus in both these forms of my invention there is a series of air-cylinders forming conduits for the passage of an air-current, with means for cooling the outer cylinder to promote condensation of moisture upon its surface as the air moves in contact therewith; also, means for draining from the apparatus such condensed water, the said means consisting in this illustration of my invention of a water-draining receptacle which is common to the series of conduits. A further likeness in the two constructions consists in the fact that in passing from the receiving-conduit to the one which has the cooled surface the direction of travel of the air-current is reversed and as it is cooled tends to pull in air through the air inlet or inlets, as the case may be. In both forms there is combined with the water-jet apparatus a perforated water-pipe disposed in close proximity to the inner surface of the receiving-conduit and discharging water thereon, preferably tangentially, and operating to produce a moving water film upon said inner surface. In Fig. 5 I have shown the pipe M as having such openings upon both sides, and in Fig. 6 there are two additional pipes, of which $M^2$ throws water upward, as at $m^2$, while $M^3$ throws it downward against the inner wall of the said cylinder, both deliveries being in the direction of travel of the water film produced by the other devices within the cylinder. In Fig. 7 the pipe M has jet-openings $m$ on one side only.

Having thus set forth the best mode now known to me for carrying my invention into practical operation, I will state that I do not wish to be limited to the precise details illustrated and described, because modifications thereof will suggest themselves to one skilled in the art without departing from the spirit of my improvement or going outside of its scope.

What I claim is—

1. In an air-cooling apparatus, the combination of a vertical cylinder, means for discharging jets of water downward into the upper end of the cylinder, a concentric cylinder having double walls, a water-pipe to deliver water between the double walls, and a water-pipe to receive water from between the double walls and deliver it to the sprayer, substantially as set forth.

2. In an air-cooling apparatus, the combination of an air-cylinder, a water-sprayer at the receiving end of the cylinder, a concentric cylinder having double walls, a water-pipe to deliver water between the double walls, and a water-pipe to receive water from between the double walls and deliver it to the sprayer, substantially as set forth.

3. In an air-cooling apparatus, the combination of an air cylinder or conduit, a surrounding cylinder of greater diameter disposed to form an air-conduit between the two cylinders, means for cooling the outer cylinder to condense moisture from an air-current, means for moving an air-current through both of said conduits in a reversed direction, and means for draining the condensed water, substantially as set forth.

4. In an air-cooling apparatus, the combination of a series of concentric cylinders or conduits, means for cooling the outer cylinder to condense moisture from an air-current, water-jets for moving an air-current through both conduits, and means for draining from the apparatus such condensed water, substantially as set forth.

5. In an air-cooling apparatus, the combination of a series of concentric cylinders or conduits, means for cooling the outer cylinder to condense moisture from an air-current, means for discharging water-jets into the inner cylinder, and moving an air-current through both conduits, and a draining water-receptacle which is common to both conduits, substantially as set forth.

6. In an air-cooling apparatus, the combination of a series of concentric cylinders or conduits, means for cooling the outer cylinder to condense moisture from an air-current, means for discharging water-jets into one of the conduits, and a perforated water-pipe disposed lengthwise within one of said cylinders and adapted to discharge water-jets against the inner surface of said cylinder, substantially as set forth.

7. In an air-cooling apparatus, the combination of a series of concentric cylinders or conduits, of which the outer one is double-walled, a sprayer adapted to discharge water-jets into the inner cylinder or conduit, and to move an air-current through said inner cylinder and thence through the outer cylinder, a water-pipe to discharge water into the double-walled cylinder, and a second water-pipe connecting the double-walled cylinder with the sprayer, substantially as set forth.

8. In an air-cooling apparatus, the combination of a series of concentric cylinders, one of which is double-walled disposed to form air-conduits between said cylinders, a sprayer for discharging water-jets into one of the cylinders and for moving an air-current through said cylinder and thence through the other of said cylinders, and a water-pipe for discharging water into the double-walled cylinder, substantially as set forth.

9. In an air-cooling apparatus, the combination of a series of concentric cylinders of which two are double-walled the cylinders being disposed to form an air-conduit between them, a water-pipe for discharging water into one end of one of the double-walled cylinders, a water-pipe connected to the opposite end of said first-named cylinder and connected to one end of the adjacent cylinder, and a water-pipe connecting the opposite end of the second-named cylinder to another cylinder, substantially as set forth.

10. In an air-cooling apparatus, the combination of a vertical cylinder, means for discharging jets of water downward into the upper end of the cylinder, a concentric cylinder having double walls, a water-pipe to deliver water between the double walls, a water-pipe to deliver water to the means which produce the jets of water, and an outer cylinder provided with an air-outlet, substantially as set forth.

11. The herein-described method or process of treating air, which consists, essentially, in moving the air through a tube or cylinder with a whirling or rotary motion about the axis of the tube, such whirling motion being interrupted by eddies, simultaneously subjecting the air to the cooling and purifying action of small bodies of water, and subsequently removing moisture from the air while it is moving in contact with a dry and relatively cold surface, substantially as set forth.

In testimony whereof I affix my signature in presence of two witnesses.

ELMER GATES.

Witnesses:
WM. H. DE LACY,
H. H. DOUBLEDAY.